United States Patent Office.

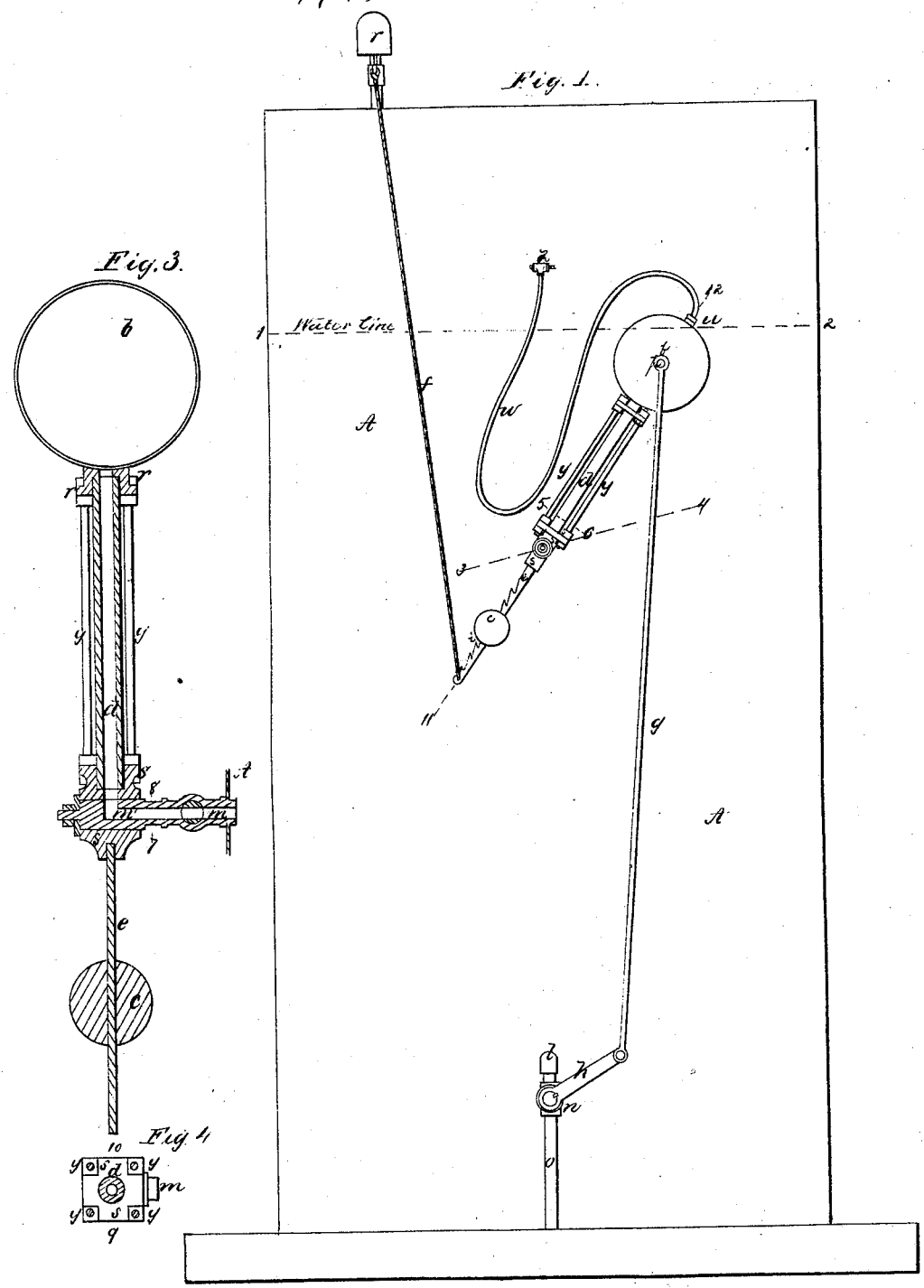

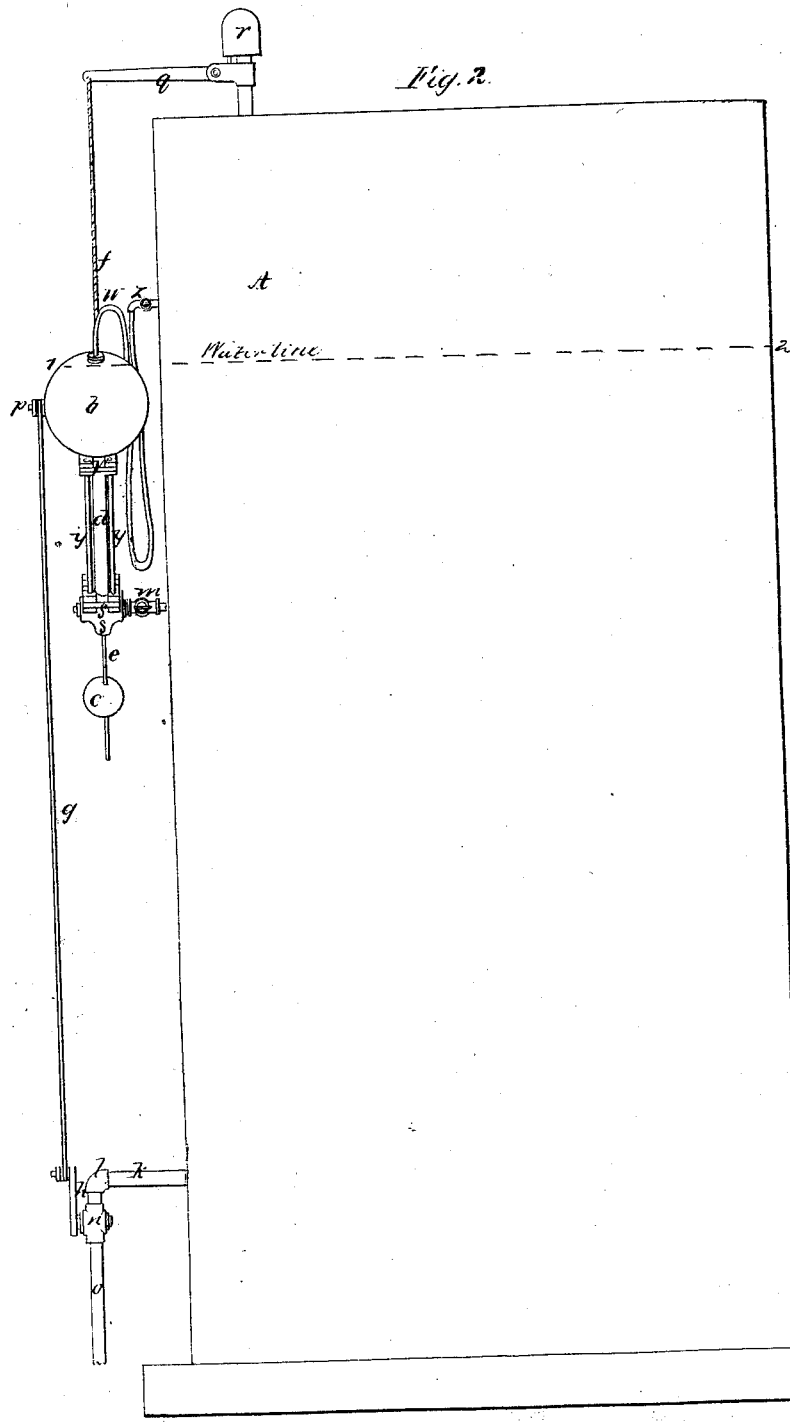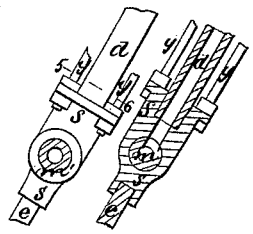

GEORGE E. CHENOWETH, OF BALTIMORE, MARYLAND.

Letters Patent No. 62,474, dated February 26, 1867.

IMPROVEMENT IN FEED-WATER REGULATORS.

*The Schedule referred to in these Letters Patent and making part of the same.*

TO ALL WHOM IT MAY CONCERN:

Be it known that I, GEORGE E. CHENOWETH, of the city and county of Baltimore, and State of Maryland, have invented certain new and useful Improvements in High and Low-Water Regulators for Steam Boilers; and I do hereby declare the following to be a full, clear, and exact description of the same, reference being had to the accompanying drawings, making a part of this specification, in which—

Figure 1 represents a side view of a steam boiler with my water regulator attached.

Figure 2 represents an end view of a boiler, showing the regulator in place and its projection from the boiler.

Figures 3, 4, 5, and 6 represent sections through several portions of the regulator.

Similar letters of reference, where they occur in the several separate figures, denote like parts of the apparatus in all of the drawings.

My invention consists in a regulator arranged outside of the boiler, but communicating with both the water and the steam within the boiler, and pivoted and poised so that the rising of the water in the boiler, above a given point, shall cause the regulator to shut off the supply, and the falling of the water below a given point, open the supply pipe or cock, and thus keep the water always at or nearly at a given line or height.

To enable others skilled in the art to make and use my invention, I will proceed to describe the same with reference to the drawings.

A may represent the side or end of a steam boiler, to which the regulator is attached by a turning joint and pipe. The regulator is composed substantially of a tube, (glass by preference,) $d$, and hollow ball or globe, $b$, connected to the tube, and supported by the rods $y$, which connect it with the hollow portion $s$, that turns upon a pipe, $m$, that communicates with the water in the inside of the boiler. To the lower end of the pivoted portion $s$ there is connected an arm, $e$, on which a weight or poise, $c$, can move, be adjusted, and fastened at pleasure. To the upper portion of the hollow ball or globe $b$ there is connected a flexible tube, $w$, which communicates with the steam space in the boiler, by an attachment, as at $z$, and allows the steam to pass into the globe or ball, which is also common to the water, through the pipes $m$ and $d$. To the ball or globe is also connected a rod, $g$, which extends downward and is attached to a lever, $h$, on a stop-cock, $n$, on the supply pipe $o$, which, when the cock is open, connects with the pipe $l$ $k$ and the water space inside of the boiler. If it be desirable to sound an alarm when the regulator works, either in shutting off or letting on a supply of water to the boiler, the portion $e$ of the regulator may be connected to a steam whistle, $r$, by a cord, chain, or wire, $f$, so that, as the regulator turns, it shall open an avenue to the whistle and allow the escaping steam to sound an alarm. Suppose the regulator to be attached to the boiler, and in the position shown in fig. 1, so that the ball or globe $b$ shall be common to the steam and water spaces in the boiler, as shown by the dotted line 1 2, which may indicate the desired height of water in the boiler. Now, if the water rises in the boiler, so as to fill the whole space in the ball with water, the water, by its weight, will cause the ball to drop slightly, and in doing so shut off the supply by the rod $g$ and stop-cock $n$. If, on the other hand, the water falls in the boiler, so that the steam space in the globe or ball should be greater than that shown, then the counterpoise $c$, on the other end of the regulator, overbalancing the globe, would drop towards a vertical position and opening wider the cock $n$, and increase the supply of water until it had arrived at the proper height, when, if it exceeded that level, the ball or globe would then, with its additional weight of water, preponderate and shut off or limit the supply, so that, between the adjusted weight $c$ and the quantity of water and steam in the globe or ball, the supply-cock is regulated and worked, so as to keep the water at a uniform, or nearly so, height in the boiler.

Having thus fully described my invention, what I claim, is—

The high and low-water indicator for steam boilers, furnished with a hollow ball at one end, which communicates with both the steam and water spaces in the boiler, and the counter or overpoise at the other end, and attached to the stop-cock on the supply pipe, so that the rising or falling of the water in the boiler, and the consequent increased or diminished quantity of water in the globe or ball, shall close or open the supply cock, substantially as and for the purpose described.

GEO. E. CHENOWETH.

Witnesses:
   A. B. STOUGHTON,
   AL. L. MELLEN.